United States Patent [19]

Badertscher

[11] 4,444,937
[45] Apr. 24, 1984

[54] LONG LIFE PAINT

[75] Inventor: Darrell J. Badertscher, Washougal, Wash.

[73] Assignee: Burke's Paint Company, Inc., Washougal, Wash.

[21] Appl. No.: 487,111

[22] Filed: Apr. 22, 1983

Related U.S. Application Data

[63] Continuation of Ser. No. 290,583, Aug. 6, 1981, abandoned.

[51] Int. Cl.$^3$ .......................... C08K 3/26; C08K 3/34; C08K 3/08; C08J 3/02
[52] U.S. Cl. .................................. 524/425; 523/220; 524/440; 524/449; 524/501
[58] Field of Search ................ 523/220; 524/425, 440, 524/449, 501

[56] References Cited

U.S. PATENT DOCUMENTS

| | | | |
|---|---|---|---|
| 3,694,394 | 9/1972 | Freeman | 524/501 |
| 3,999,957 | 12/1976 | Tongyai | 260/29.6 MM |
| 4,118,537 | 10/1978 | Vary et al. | 260/29.6 RB |
| 4,123,401 | 10/1978 | Berghinans et al. | 260/29.6 MM |
| 4,345,044 | 8/1982 | Columbus et al. | 524/425 |

OTHER PUBLICATIONS

Blackley, High Polymer Latices, vols. I and II, Applied Science Publishers, London (1966), under "Acrylate Latices".

*Primary Examiner*—John Kight, III
*Assistant Examiner*—M. L. Moore
*Attorney, Agent, or Firm*—Chernoff, Vilhauer, McClung, Birdwell & Stenzel

[57] ABSTRACT

A long-lasting water-based paint having an exceptional resistance to both chemical and mechanical damage comprises a combination of acrylic resins as pigment binders. Flaked highly corrosion-resistant stainless steel, finely ground mica flakes, calcium carbonate and a small amount of zinc oxide are included in the pigment. The paint is prepared by adding at least approximately 60% of the acrylic resin into the paint after all of the pigment, substantially reducing the amount of air entrapped in the paint during mixing.

5 Claims, No Drawings

LONG LIFE PAINT

This application is a continuation of application Ser. No. 290,583, filed Aug. 6, 1981, now abandoned.

BACKGROUND OF THE INVENTION

The present invention relates to preservative coatings and particularly to an improved water based, quick-drying, anti-corrosive paint.

The atmosphere surrounding some industrial plants such as pulp and paper mills and chemical production plants and the atmosphere along a sea coast present difficult problems of preservation of materials exposed to the weather. Steel objects such as bridges and ship hulls need a protective coating to prevent rapid surface deterioration in such atmospheric conditions.

Protection of the surface of ferrous materials in a corrosive atmosphere is particularly difficult, since rust on such surfaces can progress beneath a coating of ordinary paint. Any break through a coating of ordinary paint may permit corrosion to begin, and such corrosion will ordinarily spread from such a break, under the paint. It is therefore important for a paint to be strongly adhesive and to dry quickly to a strong impact resistant coat.

A previously known paint which provides excellent protection for metal surfaces exposed to a corrosive atmosphere includes a pigment which comprises finely flaked stainless steel, finely ground mica flakes, and barium sulfate, with a binder comprising a combination of acrylic resins in aqueous emulsion. While this paint has proved to be very durable, even in the severely corrosive atmosphere surrounding pulp and paper plants an chlorine plants, it suffers from a lack of resistance to flash rusting. That is, when the previously known paint was applied to a rusty ferrous metal surface a rust colored stain often appeared on the surface of the paint coating, detracting from its appearance.

The occurrence of such flash rusting is thought to be a result of iron ion migration through the paint film, perhaps enhanced by the chemical agents used to emulsify the acrylic resins included in the previously known paint. Although flash rust stains may be physically removed from the surface of the paint, the stains and their removal detract from the appearance of the paint surface.

In order to be highly resistant to physical and chemical damage, water-based paints have previously been manufactured in which large amounts of resin binders and pigment material are used in relation to the amount of water. Properly mixing such paint results in large amounts of air becoming entrapped in the paint in the form of small bubbles. As a result, each batch of such paint has to be allowed to rest for periods as long as two days before it can be accurately measured into containers for marketing.

What is desired, then, is an improved paint for use in exceptionally corrosive environments, which is not subject to flash rusting, which dries rapidly, and which may be packaged without long delay after its preparation.

SUMMARY OF THE INVENTION

The present invention overcomes the above-mentioned shortcomings and disadvantages of previously known paints for use in corrosive environments, by providing an improved long lasting paint including pigment of flaked stainless steel and pulverized mica and improved acrylic resin binders in a rapidly drying formula. The improved paint of the present invention provides increased resistance to mechanical and chemical action, to provide long lasting protection coupled with improved appearance of the paint coat.

The improved corrosion-resistant paint of the present invention includes a small amount of water as a base, small amounts of anti-foaming agents, dispersing agents and surfactants, and two different types of acrylic resin binders. The pigment includes highly corrosion-resistant stainless steel such as 316L stainless steel in flaked form, mica flakes of a smaller size than has previously been used, powdered zinc oxide, and powdered calcium carbonate. A coalescing agent and an anti-foaming agent are added after all the remaining ingredients have been mixed together.

In preparation of the paint of the present invention, the water, one-third of the anti-foaming agent, a dispersing agent, a buffering agent and a surfactant are mixed, and half of the total amount of an emulsion of a first type of acrylic resin is added. Thereafter, the stainless steel, mica, and zinc oxide are added and mixed, in that order, followed by a thickening agent and calcium carbonate, used as a filler pigment and to control acidity of the paint itself. Finally, the remainder of the emulsion of the first type of acrylic resin and all of an emulsion of a second type of acrylic resin are added, followed by a small amount of an ester alcohol and the remaining two-thirds of the defoaming agent. About three-fifths of the resin binder is thus added after the pigment materials. The addition of 60% of the total amount of acrylic resin emulsion at a later stage of mixing the paint results in a smaller amount of air entrapment in the mixture. This permits the paint to be packaged within four or five hours after completion of mixing, rather than only after the thirty-six to forty-eight hours previously required to permit air to escape from the completed paint mixture. Use of a thickening agent results in a paint which is easily applied in a uniform coat having the desired thickness for maximum protection of a surface.

The combination of ingredients of the present invention provides a paint which may be packaged earlier, and which provides greater protection and better appearance than previously available water-based paints for use in corrosive conditions.

It is therefore a primary objective of the present invention to provide an improved long-lasting water-based anti-corrosive paint.

It is another important objective of the present invention to provide a paint which is not subject to flash rusting.

It is a further important objective of the present invention to provide a paint which may be packaged within a short time after completion of mixing.

It is a principal feature of the present invention that it includes a pigment comprising minute flakes of a highly corrosive resistant stainless steel along with extremely small flakes of mica, powdered calcium carbonate and a small amount of powdered zinc oxide, the combination providing extreme resistance to corrosion and flash rusting.

It is another important feature of the present invention that it includes an improved combination of acrylic resin binders, resulting in superior adhesion and durability of the paint.

It is yet a further feature of the present invention that it provides a method of preparation of a paint by mixing 60% of the emulsified acrylic resin binders into the paint after nearly all of the other ingredients, resulting in entrapment of smaller amounts of air in the paint mixture.

It is a principal advantage of the present invention that it provides a paint which is free from flash rusting, providing a better appearance than previously known similar paints.

It is another important advantage of the present invention that it provides a method of preparation of a high-solids paint in which less air is entrapped in the paint during mixing, resulting in the ability to package the paint sooner after completion of mixing.

It is yet a further advantage of the present invention that it provides a paint having superior durability and resistance to both physical and chemical action.

DETAILED DESCRIPTION OF THE INVENTION

The present invention is a durable, corrosion-resistant paint having a water base, acrylic resin binder, and a pigment comprising flaked stainless steel, finely ground mica flakes, powdered zinc oxide, and powdered calcium carbonate.

The paint of the present invention may be prepared using a high speed disperser such as those commonly used throughout the paint industry, taking care that the processing temperature does not exceed 100° Fahrenheit. The ingredients should be added to the mixture in the order and relative amounts listed in Table 1 below:

TABLE 1

| | Description of Ingredients | Percentage (by weight) of complete paint formulation |
|---|---|---|
| (1) | Water | 10.1–12.3 |
| (2) | Defoaming Agent - one of a variety of commercially available defoaming agents for use in paint formulation. | .212–.260 |
| (3) | Aminomethyl propanol - this acts as a buffering agent and shelf-life extender. | .141–.173 |
| (4) | Pigment Dispersant, such as a sodium salt of a polycarboxylic acid, available from various commercial sources for aiding in dispersal of finely divided pigment particles into a base during manufacture of paints. | .156–.190 |
| (5) | Surfactant (to promote wetting of finely divided particles of pigment material by the water-based mixture). Various surfactants for use in paint formulations are available through commercial sources. | .141–.173 |
| (6) | An aqueous emulsion of a first type of acrylic resin, used as a binder for the pigment material. This first type of resin should be tough and extremely strongly adhesive in cured form. | 19.15–23.41 (based on emulsion containing 45.5% resin and 54.5% water) |
| (7) | Highly corrosion-resistant stainless steel in finely flaked form, with particle dimensions preferably smaller than 325 mesh. | 17.73–21.66 |
| (8) | Finely ground mica, with flake dimensions smaller than 325 mesh. | 3.55–4.34 |
| (9) | Zinc oxide powder. | 1.06–1.30 |

TABLE 1-continued

| | Description of Ingredients | Percentage (by weight) of complete paint formulation |
|---|---|---|
| (10) | Thickening agent, such as a hydroxyethyl cellulose composition available from commercial sources for use in paint formulation. | .106–.130 |
| (11) | Calcium Carbonate powder. | 7.10–8.76 |
| (12) | An additional amount of the aqueous acrylic resin emulsion of item (6). | 19.15–23.41 |
| (13) | Aqueous emulsion of an extremely hard, blister, chemical, and abrasion-resistant acrylic resin material, available from commercial sources for use in paint formulation. The most desirable characteristic for such a resin is abrasion resistance. | 9.58–11.70 (based on emulsion containing 46.5% resin and 53.5% water) |
| (14) | A coalescing agent which is cooperative with the resin formulation to enhance coating ability of the paint formulation at lower temperatures, approaching the freezing point of water - for example an ester alcohol such as trimethyl pentane diol monoisobutyrate. | 1.42–1.73 |
| (15) | Anti-foaming agent. This can be the same anti-foaming agent used as item (2), in approximately double the amount. | .426–.520 |

The most important aspects of the paint composition of the present invention are the use of an extremely corrosion-resistant stainless steel having a high chromium and nickel content in extremely finely divided flake form, preferably finer than 325 mesh. This is accompanied by extremely finely divided particles of mica for example having an average diameter of 5–10 microns. The mica flakes cooperate with the stainless steel in forming a durable abrasion resistant non-porous surface, which is thought to be at least partially a result of cooperative alignment of the mica and steel flakes.

These pigment materials are combined with an extremely tough and abrasion-resistant combination of acrylic resins which, like the stainless steel and mica, have exceptionally good resistance to corrosive chemicals carried in the atmosphere surrounding industrial plants, and to the action of salt air and sea water.

Paint formulated according to the present invention has demonstrated an ability to be used to coat even corroded iron surfaces without the occurrence of flash rusting which was a disadvantage in previously known waterbase paints having stainless steel pigment and acrylic resin binders.

EXAMPLE

An exemplary formulation of the paint of the invention was prepared by mixing the following ingredients, each being added to the mixture in the order listed. A high speed disperser was used to mix the ingredients, with the temperature being maintained below 100° Fahrenheit during preparation of the paint.

TABLE 2

| | Ingredient | Pounds | Gallons |
|---|---|---|---|
| 1. | Water | 142.00 | 17.00 |
| 2. | "Colloids 640" | 3.00 | .38 |
| 3. | "AMP-95" | 2.00 | .25 |
| 4. | "Colloids 111" | 2.20 | .25 |
| 5. | "Igepol CO-630" | 2.00 | .25 |
| 6. | "Rhoplex MV-9" | 270.00 | 30.00 |
| 7. | "Staysteel - 316" | 250.00 | 4.00 |
| 8. | "C-3000 Mica" | 50.00 | 2.10 |
| 9. | Zinc Oxide "XX-503" | 15.00 | .30 |
| 10. | "Natrasol 250 HR" | 1.50 | .15 |
| 11. | "Omyacarb 4" | 100.00 | 4.44 |
| 12. | "Rhoplex MV-9" | 270.00 | 30.00 |
| 13. | "Rhoplex AC-61" | 135.00 | 15.00 |
| 14. | "Texanol" | 20.00 | 2.50 |
| 15. | "Colloids 640" | 6.00 | .75 |

The ingredients listed in Table 2 are described in greater detail as follows:

TABLE 3

| Item No. from Table 2 | |
|---|---|
| (2) | "Colloids 640" is the trademark for a defoaming agent available from Colloids, Inc., of Newark, New Jersey |
| (3) | "AMP-95" is the trademark for a mixture of 95% aminomethyl propanol and 5% water available from International Minerals & Chemicals of DesPlains, Illinois. It acts as a buffering agent and shelf-life extender by helping the ingredients of the entire paint formulation to remain mixed together. This also aids in prevention of corrosion of the interior of a paint can exposed to the normally alkaline chemical structure of the paint. |
| (4) | "Colloids 111" is the trademark for a sodium salt of a polycarboxylic acid available from Colloids, Inc. of Newark, New Jersey. "AMP 95" and "Colloids 111" cooperatively aid in dispersing powdered pigment materials. |
| (5) | "Igepol CO-630" is the trademark for a surfactant composition available from the GAF Corporation of New York, New York. |
| (6) | "Rhoplex MV-9" is the trademark for an aqueous emulsion of an acrylic resin available from Rohm & Haas Co., of Philadelphia, Pennsylvania. The emulsion is 45.5% acrylic resin and 54.5% water. |
| (7) | "Staysteel-316" is the trademark for flaked 316L stainless steel available from U. S. Bronze Powders, Flemington, New Jersey. 316L stainless steel typically includes .08% carbon, 2% manganese, .045% phosphorus, .03% sulphur, 1% silicon, 16-18% chromium, 10-14% nickel and 2-3% molybdenum. This composition is non-magnetic and has a high resistance to the corrosive materials associated with the pulp and paper industry. For use in the paint formulation of the present invention it is flaked into extremely fine particles, 98% of which are finer than 325 mesh. |
| (8) | "C-3000 Mica" is the trademark for a finely ground isomorphic hydrous aluminum potassium silicate mica available from the English Mica Company, Stamford, Connecticut, with an average particle diameter of 5-10 microns, 99.25% finer than 325 mesh. |
| (9) | Zinc Oxide "XX-503" is the trademark for a powdered zinc oxide available from G & W Natural Resources Group of Bethlehem, Pennsylvania. |
| (10) | "Natrasol 250 HR" is the trademark for a viscous grade of paint thickener predominantly comprising hydroxyethyl cellulose, available from Hercules, Inc., of Wilmington, Delaware. |
| (11) | "Omyacarb 4" is the trademark for a calcium carbonate powder having 3.5 micron mean particle size, available from Pleuss-Staufer (California), Inc., of Lucern Valley, California. |
| (12) | "Rhoplex MV-9" - same as (6) |
| (13) | "Rhoplex AC-61" is the trademark for an aqueous acrylic emulsion which sets to an extremely hard, abrasion and blister resistant composition, available from Rohm & Haas, Philadelphia, Pennsylvania. The emulsion is 46.5% acrylic resin and 53.5% water. |
| (14) | "Texanol" is the trademark for an ester alcohol composition available from the Ashland Chemical Company of Columbus, Ohio. "Texanol" is 60% trimethyl pentane diol monoisobutyrate. |
| (15) | "Colloids 640" - same as (2) above. |

The paint prepared as set forth above was sufficiently free of entrapped air to permit accurate measurement and packaging in paint cans within less than five hours after mixing.

The paint thus prepared was applied over a rusted steel surface in a film having approximately a 5 mil thickness when wet and a 2½ mil dry film thickness. The paint was dry to the touch approximately one half hour after application. A second similar coat was applied after the first coat was thoroughly dry, to give a total dry film thickness of about 5 mils. The paint produced a hard, tightly adhering coating on the steel surface, which cured completely within seven days, with no evidence of flash rusting appearing.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A long-lasting corrosion-resistant paint, comprising:
   (a) about 10 to 12 weight percent water;
   (b) an aqueous emulsion of a first acrylic resin, equivalent to "Rhoplex MV-9" in an amount of said emulsion providing said first acrylic resin in the amount available in 38 to 46 weight percent of an aqueous emulsion including about 45.5 percent of said first acrylic resin and about 54.5 percent water;
   (c) about 17.5 to 22 weight percent flaked 316L stainless steel having an average particle size no greater than about 325 mesh;
   (d) about 3.5 to 4.3 weight percent powdered mica having an average particle size no greater than about 325 mesh;
   (e) about 7 to 9 weight percent calcium carbonate powder;
   (f) about 1 to 1.4 weight percent powdered zinc oxide;
   (g) an aqueous emulsion of a second acrylic resin in an amount providing said second acrylic resin equivalent to "Rhoplex AC-61" in the amount available in 9.5 to 11.5 weight percent of an aqueous emulsion containing about 46.5 percent of said second acrylic resin and about 53.5 percent water; and
   (h) additional ingredients to result in a total of 100 weight percent.

2. The paint of claim 1 further comprising among said additional ingredients about 1.3 to 1.8 weight percent of ester alcohol.

3. The paint of claim 1 wherein said powdered mica consists predominantly of isomorphic hydrous aluminum potassium silicate.

4. The paint of claim 1 further comprising among said additional ingredients about 0.14 to 0.17 weight percent of a sodium salt of a polycarboxylic acid.

5. A process for manufacturing a corrosion resistant water-based paint having a stainless steel-based pigment, comprising:
   (a) providing a water base of about 10 to 12 weight percent of the entire quantity of paint being prepared;
   (b) thoroughly mixing therewith about 0.21 to 0.26 weight percent of an anti-foaming agent, about 0.16 to 0.19 weight percent of a pigment dispersant including a sodium salt of a polycarboxylic acid, about 0.14 to 0.17 weight percent of a buffering agent, and about 0.14 to 0.17 weight percent of a surfactant;
   (c) thereafter adding to and mixing with the previously mixed ingredients about 19.1 to 23.4 weight percent of an aqueous emulsion of a first acrylic resin which is equivalent to "Rhoplex MV-9", about 45.5 weight percent of said aqueous emulsion being said first acrylic resin;
   (d) thereafter adding to and thoroughly mixing with the previously mixed ingredients about 17.7 to 21.7 weight percent of finely flaked corrosion-resistant type 316L stainless steel substantially free from flake dimensions greater than 325 mesh, about 3.55 to 4.34 weight percent of powdered mica having an average particle size no greater than 325 mesh, and about 7.1 to 8.8 weight percent of powdered calcium carbonate;
   (e) thereafter adding to and mixing with the previously mixed ingredients an additional 19.1 to 23.4 weight percent of said aqueous emulsion of said first acrylic resin;
   (f) thereafter adding to and thoroughly mixing with the previously mixed ingredients about 9.6 to 11.7 weight percent of an aqueous emulsion of a second acrylic resin, equivalent to "Rhoplex AC-61" about 46.5 percent of the emulsion being said second acrylic resin; and
   (g) after step (e) adding to and thoroughly mixing with the previously mixed ingredients about 0.43 to 0.52 weight percent of anti-foaming agent.

* * * * *

UNITED STATES PATENT AND TRADEMARK OFFICE
CERTIFICATE OF CORRECTION

PATENT NO. : 4,444,937
DATED : April 24, 1984
INVENTOR(S) : Darrell J. Badertscher It is certified that error appears in the above-identified patent and that said Letters Patent is hereby corrected as shown below:

Column 1, line 35, "an" should read -- and --.

Column 2, line 59 "corrosive" should read -- corrosion --.

Column 6, line 57, after "resin" insert -- equivalent to "Rhoplex AC-61"--; line 59, delete "equivalent to "Rhoplex AC-61".

Signed and Sealed this

Twenty-third Day of April 1985

[SEAL]

*Attest:*

DONALD J. QUIGG

*Attesting Officer*   *Acting Commissioner of Patents and Trademarks*